Nov. 16, 1937.    C. W. BALLMAN    2,099,254
FISHING ROD HOLDER
Filed July 15, 1935
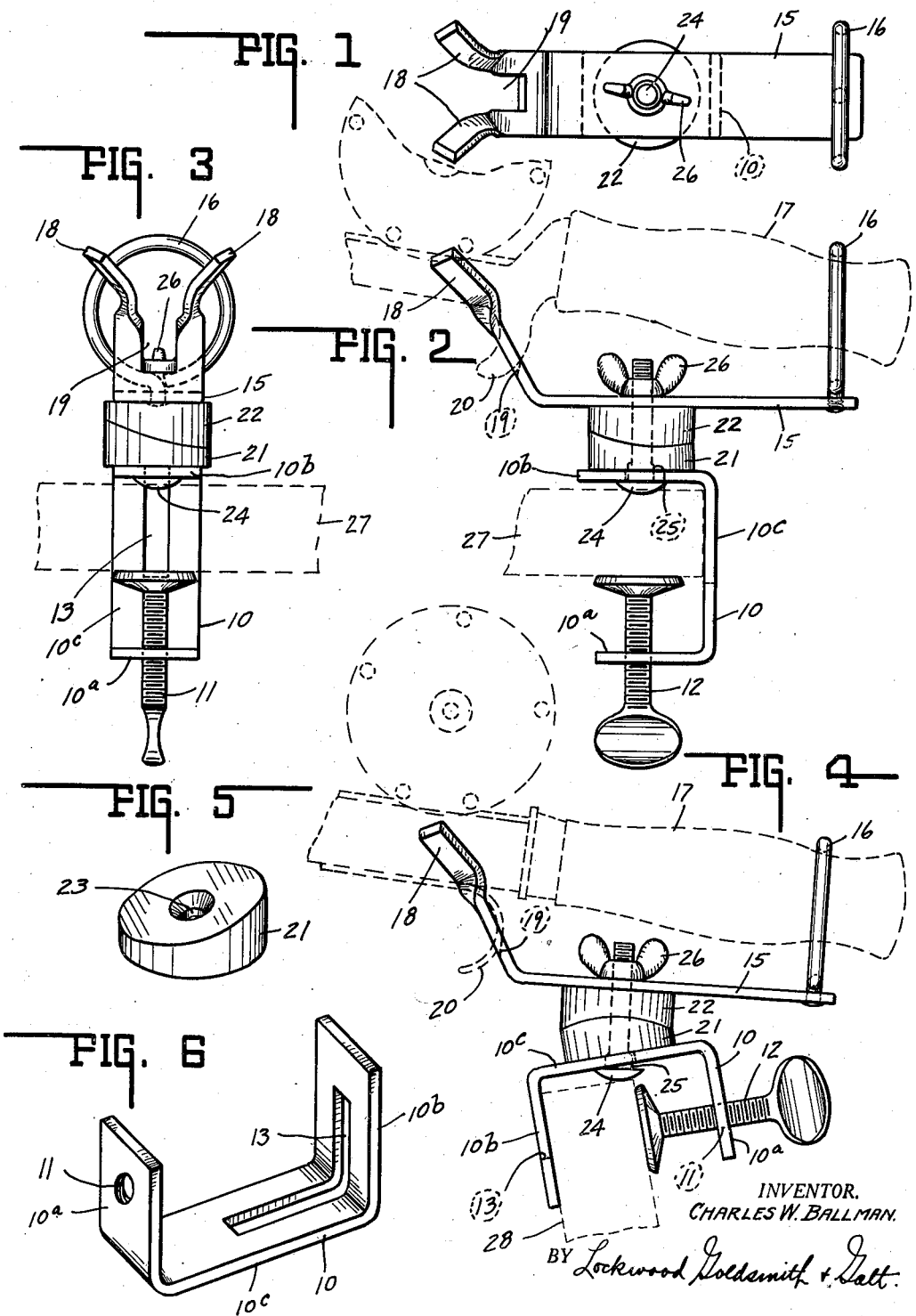
INVENTOR.
CHARLES W. BALLMAN.
BY Lockwood Goldsmith & Galt
ATTORNEYS.

Patented Nov. 16, 1937

2,099,254

UNITED STATES PATENT OFFICE 2,099,254

FISHING ROD HOLDER

Charles W. Ballman, Indianapolis, Ind.

Application July 15, 1935, Serial No. 31,314

1 Claim. (Cl. 248—42)

This invention relates to a device for holding a fishing rod in a desired adjusted position. One object of the invention is to provide a device of this type which may be attached either to the gunwale or the seat of a row boat and in which any type of fishing rod may be set at any desired elevation and direction and which may be quickly and easily changed from a gunwale to a seat mounting, or vice versa.

Another object of the invention is to provide a device of this type which is as light and simple in construction as may be.

One feature of the invention resides in the provision of a base member in the form of a clamp provided with suitable openings for the attachment of a rod-supporting member so arranged that the base may be clamped either to the gunwale or the seat, and may be quickly changed from one to the other.

Another feature of the invention is the provision of an angularly adjustable means between the base and the rod-supporting member by which the elevation of the rod may be readily adjusted as desired.

Another feature of the invention resides in the specific form of the angular adjusting means and still other features reside in the specific form of the rod-supporting member.

Other objects and features of the invention will be understood from the accompanying drawing and the following description and claim:

Fig. 1 is a top plan view of the device as a whole in one of its preferred forms. Fig. 2 is a side elevational view of the device as assembled when clamped to a seat, showing in dotted lines a particular type of fishing rod carried thereby. Fig. 3 is an end view of the same arrangement. Fig. 4 is an elevational view of the device assembled on the gunwale of the boat with a slightly different form of rod shown in dotted lines therein. Fig. 5 is a perspective view of one of the members provided for securing the desired angular adjustment between the base and the rod-supporting member. Fig. 6 is a perspective view of the base.

The base member 10, as shown in the drawing by way of illustration, consists of a strip of iron or similar material substantially U-shaped in form. One leg 10a of the base is provided with a threaded opening 11 for receiving a clamp screw 12. The opposite leg 10b is provided with a slotted opening 13 which extends also into the portion 10c of the base between the legs thereof. The opposite ends of the slotted opening 13 stop substantially in the middle of the portions 10b and 10c.

The rod supporting member 15 consists of a piece of steel or similar material having at one end a loop 16 which receives the butt of the grip 17 of the fishing rod. At the opposite end of the rod-supporting member, there is provided an up-turned yoke 18 within which the portion of the fishing rod above the grip may rest, as shown in both Figs. 2 and 4. The yoke 18 is provided with a slot 19, best seen in Figs. 1 and 3, within which the finger grip 20 of the fishing rod may rest. The finger grip thus serves to maintain the rod and reel upright in a most accessible position. If the rod has no finger grip or reel, it merely rests on the outwardly turned arms of the yoke 18.

Between the base 10 and the rod-supporting member 15 there is interposed a pair of adjusting elements or spacers 21 and 22 herein shown in the form of angularly truncated cylinders, each having a central hole 23. A bolt 24, preferably a carriage bolt, passes through the slotted opening 13, through the holes 23 and through a suitable opening in the rod-supporting member 15. The upper end of the bolt is provided with a wing nut 26 which clamps the entire structure together. The squared shank 25 of the carriage bolt 24 engages the slotted opening 13 in the base 10 and thus prevents rotation of the bolt.

In assembling the device on a seat of the boat, or other horizontal support, the bolt 24 is placed in the portion of the slot 13 in the leg 10b of the base 10, as shown particularly in Fig. 2, and the base is then clamped by the screw 12 to the seat 27. This brings the rod-carrying member 15 into a substantially horizontal position. The angle of elevation of the member 15 may be adjusted by loosening the wing nut 26 and rotating one or both of the adjusting elements 21 and 22. The fact that the abutting faces of the adjusting elements are oppositely inclined permits the member 15 and the fishing rod to be set at any desired elevation by such manipulation. It will be seen from Fig. 5 that the holes 23 are countersunk to permit free play of the bolt 24 therein during manipulation of the members 21 and 22 for vertical adjustment of the rod. The rod may be set in any desired direction by rotating the rod-carrying member 15 about the bolt 24 before the wing nut 26 is clamped tight to retain the entire device in the desired adjusted position.

When it is desired to clamp the device to the gunwale of the boat or other vertical support, the bolt 24 is placed in the portion of the slot 13 in the portion 10c of the base 10, as shown in Fig. 4. The device is then clamped to the gunwale 28 by means of the clamp screw 12 and the elevation and direction of the rod may be adjusted as before.

From the foregoing specification, it will be apparent that the device provides an extremely convenient and adaptable rest for a fishing rod. The adjustments for elevation and direction are easily made and the adjustment for a vertical or horizontal support is very simple. The number of parts is small, making the manufacturing problem much less difficult than for other devices of the kind in prior use.

While the preferred form of the invention has been described in detail, modifications thereof, apparent to those skilled in the art, may be made without departing from the scope of the invention as defined by the appended claim. For example, it is not necessary in all cases that the slotted opening 13 be employed exactly as shown. An arrangement in which unconnected openings in the leg 10b and the part 10c of the base are used permits mounting on both vertical and horizontal supports with only slightly less convenience than with the arrangement shown.

The invention claimed is:

In a fishing rod holder having a rod engaging portion and means for clamping said holder to a supporting object, means interposed between said rod engaging portion and said clamp to provide for angular adjustment of said rod engaging portion, said means comprising a pair of disc-like members each having faces one perpendicular to its axis and the other at an angle thereto, said angular faces being in engagement with each other, whereby relative rotation of the discs varies the angle of the holder.

CHARLES W. BALLMAN.